United States Patent [19]

Holle et al.

[11] 3,853,575

[45] Dec. 10, 1974

[54] SUBSTANTIALLY NON-GREYING TITANIUM DIOXIDE PIGMENTS FOR USE IN RESIN COMPOSITIONS

[75] Inventors: Bernd Holle; Gerhard Winter, both of Krefeld, Germany

[73] Assignee: Bayer Aktiengesellschaft, Leverkusen, Germany

[22] Filed: Jan. 24, 1973

[21] Appl. No.: 326,204

[30] Foreign Application Priority Data

Feb. 12, 1972 Germany............................ 2206776
Feb. 12, 1972 Germany............................ 2206775
Feb. 12, 1972 Germany............................ 2206772

[52] U.S. Cl. ............................ 106/300, 106/308 B
[51] Int. Cl. ............................................ C09c 1/36
[58] Field of Search ............ 106/300, 308 B, 308 N, 106/309

[56] References Cited

UNITED STATES PATENTS

| | | | |
|---|---|---|---|
| 2,161,975 | 6/1939 | Peterson ............................ | 106/300 |
| 2,246,030 | 6/1941 | Ancrum et al. ..................... | 106/300 |
| 2,260,177 | 10/1941 | Giese ................................ | 106/300 |
| 2,671,031 | 3/1954 | Whately ............................. | 106/300 |

Primary Examiner—Delbert E. Gantz
Assistant Examiner—J. V. Howard
Attorney, Agent, or Firm—Burgess, Dinklage & Sprung

[57] ABSTRACT

A process for the production of a substantially non-greying titanium dioxide pigment coated with a layer of aluminum oxide aquate, comprising drying at about 25° to 200°C a suspension of a titanium dioxide pigment in a solution of a basic aluminum salt, said solution being selected from the group consisting of (a) a solution of basic aluminum chloride containing an oxidizing salt, (b) a solution of basic aluminum nitrate, and (c) mixtures thereof. The oxidizing salt is preferably selected from the group consisting of a nitrate, nitrite, peroxy sulfate, peroxide addition compound or mixture thereof. The pigment is especially useful for incorporation to the extent of about 1.0 to 40% by weight into melamine-formaldehyde-, urea-formaldehyde- or phenol-formaldehyde-based laminates.

11 Claims, No Drawings

SUBSTANTIALLY NON-GREYING TITANIUM DIOXIDE PIGMENTS FOR USE IN RESIN COMPOSITIONS

This invention relates to a process for the production of substantially non-greying, titanium dioxide pigments for use in resin compositions by aftertreatment with (a) basic aluminum chloride solutions in the presence of oxidizing salts or (b) basic aluminum nitrate solutions.

Resin compositions, especially melamine-formaldehyde, urea-formaldehyde and phenol-formaldehyde resins are widely used on an industrial scale. Laminates, i.e., pressed multi-layer materials in which the resin holds together individual layers of, for example, wood, paper, polymers or glass fibers, providing them with strength and hardness, have a particularly wide range of industrial applications. Laminates in this form can be processed into scratch-resistant table coverings, boards for furniture and panelling. Since some of the afore-mentioned resin compositions are soluble in water, they can be opacified relatively easily by incorporation of different pigments. It is possible in this way significantly to broaden their range of applications.

One pigment that is particularly suitable for this purpose is titanium dioxide. However, it has been known for some time that titanium dioxide is photochemically active. Exposure to ultra voilet light is phenol-, melamine-or urea-formaldehyde-based laminates pigmented with $TiO_2$, results in steadily increasing greying effect which can be attributed to a blue-grey discoloration of the $TiO_2$-pigment incorporated. Accordingly, attempts have been made over a long period to reduce the photoactivivty of rutile pigments by subjecting them to an aftertreatment. However, an effective reduction in photoactivity can only be achieved by subjecting the aftertreated pigments to an expensive, complicated calcination treatment. Attempts have also been made over an even longer period to produce pigments with adequate photostability which can readily be incorporated into resin-based laminates without any need for the complicated and expensive calcination treatment.

An inorganic aftertreatment of titanium dioxide pigments followed by drying of the pigments, is known. The aftertreatment of titanium dioxide pigments with a few basic transition-metal salts, for example titanyl sulfate is disclosed in U.S. Pat. No. 2,214,132 and British Patent Specification 252,262; the aftertreatment with special basic aluminum salts is disclosed in U.S. Pat. No. 2,357,101. In German Offenlegungsschriften Nos. 1,592,956 and 1,592,945 the actual aftertreatment is carried out by neutralizing hydrolytically dissociable salts with ammonia in an aqueous titanium dioxide pigment suspension before drying. The subsequent drying stage, which is carried out at temperatures of from 200° to 850°C, is intended to remove the volatilizable salts formed during the neutralization. German Offenlegungsschrift No. 2,046,739 and British Patent Specification 1,134,249 describe a process for coating metal oxide particles in which a water-containing metal oxide is precipitated on to the particles from an aqueous solution. In this case, the precipitation solution is subjected to a special ageing process. Unfortunately, rutile pigments aftertreated in this way do not show adequate photostability in the aforementioned resin systems.

U.S. Pat. No. 3,427,278 describes resin systems which contain titanium dioxide pigments and which are photochemically inert. From 0.1 to 5 % of nitrate is incorporated in these resin systems. The disadvantage of this process is that the nitrates added are soluble in water and, in the case of hydrolytic dissociation, have a polymerizing effect upon the resins and complicate the process by causing hardening of the resin.

It is accordingly an object of the present invention to provide non-greying titanium dioxide in simple manner, which pigments are stable and especially suited for the use in resin laminate systems.

These and other objects and advantages are realized in accordance with the present invention pursuant to which there are provided non-greying, titanium dioxide pigments coated with a layer of aluminum oxide aquate by a process wherein an aqueous titanium dioxide pigment suspension is dried at temperatures of from about 25° to 200°C with a solution of (a) basic aluminum chloride or (b) basic aluminum nitrate or (c) mixtures thereof in the presence of oxidizing salts.

In one embodiment of the present process, the inorganic aftertreatment does not take place before drying, but through the drying operation itself. The oxidizing constituents present in the liquid phase in the suspension are not intended to be removed by drying, but instead they are intended to be largely incorporated into the aluminum oxide aquate formed during the drying operation. In the context of the invention, "aluminum oxide aquate" is the gel which is formed when the basic aluminum salt solutions are concentrated during the drying operation and in which most of the oxidizing salts are incorporated. Drying can be carried out at relatively low temperatures of from about 25°C to 200°C and, in practice, at temperatures of from about 80°C to 120°C. The pigment suspension can be concentrated through drying in any way, for example in a drying cabinet, thin-layer evaporator, belt dryer, cylinder dryer or even by spray drying. Before drying, no oxide aquates are precipitated in the presence of the aqueous titanium dioxide suspension.

The basic aluminum salts which can be used for the process according to the invention dissolve completely in water to form particles of the colloidal order of magnitude. The word "basic" is not intended to imply an alkaline reaction of these aluminum compounds, but only to express the fact that, in purely stoichiometric terms, these aluminum salts predominantly contain OH-anions. Compounds with a ratio of aluminum cation to chloride and/or nitrate anion of from 0.5 to 5. preferably from 0.1 to 3.0 (disregarding OH as anion), are suitable for the purposes of the invention.

Examples of these compounds include $Al_2(OH)_5Cl$ (cation : anion ratio 2), $Al(OH)_2Cl$ (cation : anion ratio 1), as well as $Al(OH)_{2.5}(NO_3)_{0.5}$ (cation : anion ratio 2), $Al(OH)_2NO_3$ (cation : anion ratio 1), $Al(OH)_{2.8}(NO_3)_{0.2}$ (cation : anion ratio 5), and the like, as well as mixtures thereof.

In the process according to the invention, the titanium dioxide pigment is suspended in water and made into a pulp with a solution of one of the aforementioned basic aluminum chlorides and/or nitrates. This results in the formation of a pigment suspension with a pH-value of from about 4.0 to 7.0, preferably from about 5.0 to 6.5, depending upon the type of pigment, the basicity and the quantity of aluminum salts. Salts with oxidizing anions are additionally introduced into this system (pigment suspension + basic aluminum salt). In the case where basic aluminum nitrates are used as basic aluminum salts, however, it is not necessary to introduce additionally oxidizing anions, as the nitrate of the basic aluminum nitrate itself may be incorporated into the aluminum oxide aquate. In the context of the invention, oxidizing salts means salts which contain the anions nitrate, nitrite and peroxy disulfate, as well as peroxidic addition compounds such as sodium perborate, $NaBO_2 \cdot H_2O_2$ and sodium percarbonate, $Na_2CO_3 \cdot H_2O_2$. Preferred cations of these salts are the alkali metal cations, alkaline earth metal cations and also ammonium cations. It is also possible to use mixtures of these oxidizing salts for the aftertreatment.

By drying the titanium dioxide pigment suspension at relatively low temperatures in accordance with the invention, the basic aluminum salts are converted into oxide gels which surround the individual titanium dioxide pigment particles. The oxidizing salts additionally present are firmly incorporated in this surrounding layer. Since the aluminum salts used in accordance with the invention are basic salts (i.e. salts with a deficit of acid anions), no appreciable quantities of foreign free salts or of free acid accumulate when they are dried on to the pigment. By drying the titanium dioxide pigment suspension, the basic aluminum salts added are converted into oxide gels which surround the individual titanium dioxide pigment particles and, in particular, fix the oxidizing anions present in the system. Due to the low drying temperatures employed, there is no danger of any change in the grain-size spectrum of the pigment. A certain, albeit small, salt or electrolyte content in the pigment is characteristic of the process according to the invention, being desirable for obtaining pigments of outstanding laminate stability. It is possible in the process according to the invention to use titanium dioxide suspensions in very wide concentration ranges varying from distinctly liquid to pasty consistencies (about 5 to 80% by weight of $TiO_2$, based on the weight of the suspension). The most suitable suspension concentration is governed above all by the technique used for concentration.

In another embodiment of the present process coating of the pigment particles with a layer of aluminum oxide aquate is carried out by slowly and steadily increasing the pH-value of an aqueous pigment suspension with the basic aluminum salt solution added to it, with alkali or ammonium hydroxide or alkali carbonate at ambient temperatures in the range of about 10° to 40°C in the presence of the salts containing oxidizing anions. Thereafter the pigment suspension is filtered and washed.

The basic aluminum salt solutions used in accordance with the invention contain particles of the colloidal order of magnitude. It is possible to speak in terms of an aluminum oxide sol which is impoverished in anions (disregarding OH as an anion). The preparations of sols such as these is not dependent upon a special ageing process. By increasing the pH-value of the solution, the aluminum oxide sol is converted into an aluminum oxide gel which forms the layer of aluminum oxide aquate on the pigment particles. Since the aluminum oxide sols according to the invention are more impoverished in anions than sols of the kind obtained by neutralizing aluminum salts, anions additionally added to the system can readily be incorporated into the oxide gel formed by conversion of the oxide sol during the neutralization process. According to this invention colorless oxygen-containing anions having an oxidizing effect, preferably nitrates, nitrites, peroxy sulfates and $H_2O_2$ or peroxide-addition compounds, for example perborates such as $BO_2^-$. $H_2O_2$, are incorporated into the aluminum oxide aquate layer formed. Mixtures of salts containing these anions having an oxidizing effect can also be used for the aftertreatment. To this end, solutions of salts containing these anions are added to the suspended pigment suspension before or during conversion of the oxide sol into oxide gel by increasing the pH. In one advantageous embodiment, the process according to the invention comprises the following stages:

1. Preparing the basic aluminum salt solution.
2. Making the pigment into a pulp with the basic aluminum salt solution.
3. Increasing the pH of the pigment suspension as uniformly as possible by addition of alkali (spraying in or on, pumping) to a pH-value of about 5.0 to 6.0 over a period of about 0.25 to 2 hours.
4. Adding an aqueous solution of an oxidizing salt at a pH-value of the aluminum-salt-containing pigment suspension of about 5.0 to 6.0
5. Increasing the pH-value of the pigment suspension as homogeneously as possible to a value of about 6.0 to 7.0 over a period of about 0.5 to 4 hours.
6. Increasing the pH-value of the pigment suspension as homogeneously as possible to a value of about 7.0 to 8.0 over a period of about 15 to 60 minutes.
7. Filtration, washing with cold water, drying and grinding the aftertreated pigment.

The drying mentioned as item 7 can be carried out at a relatively low temperature in the range of about 25°C to 250°C, in practice at a temperature of about 100°C to 200°C. The purified filter sludge can be dried in any way, for example in a drying cabinet, thin-layer evaporator, belt dryer, cylinder dryer or by spray drying. The relatively low drying temperatures are explained by the fact that there is no need during drying to remove any salts incorporated in the system.

The basic aluminum salts according to the invention can be prepared by any one of the known methods for producing basic aluminum salt solutions (cf. Gmelins Handbuch d. Anorg. Chemie, 8th Edition, No. 35, Al part B, pages 117 – 125, 156 et seq, 205 et seq (1934), for example by dissolving aluminum metal in a deficit of hydrochloric or nitric acid or by peptizing $Al(OH)_3$ in a deficit of acid.

It is possible by the process according to the invention to deposit quantities of from about 0.5 to around 10 % by weight of aluminum oxide aquate on to the $TiO_2$-pigment particles, although for the purposes of the invention optimal results are obtained with quantities as small as from about 2 to 5% by weight of $Al_2O_3$ (based on $TiO_2$). Coating with the aluminum oxide aquate is accompanied by completion of the incorporation of the oxidizing salts into the surrounding layer, the resulting pigment containing from about 0.05 to 3 % by weight, preferably from about 0.2 to 2 % by weight and especially from about 0.3 to 1.5 % by weight, of the oxidizing anions.

In some cases, substantially non-greying, $TiO_2$-pigments are obtained with a content as low as about 0.05% by weight (based on $TiO_2$) of the oxidizing anion present in the aluminum oxide aquate by the process according to the invention. The presence of the oxidizing salts only leads to pigments with optimum non-greying properties in conjunction with the inventive incorporation of the oxidizing anions in the aluminum oxide aquate. A purely mechanical addition (for example by rubbing, mixing or grinding) of aluminum salts either individually or in combination with the aforementioned oxidizing salts, leads to $TiO_2$-pigments which, due to a large content of free electrolyte, show poorer pigment properties and, due to the inadequate effectiveness of the oxidizing additives, lower resistance to greying as well. Thus, the direct admixture of stoichiometric or basic aluminum salt solutions showing an acid reaction due to hydrolysis, with $TiO_2$-pigments, followed by incorporation into melamine-formaldehyde-based resin compositions, results in instantaneous polymerization of the resin composition which becomes rock hard and can no longer be further processed. Similarly, the aforementioned addition of oxidizing substnces, unless they have been partially incorporated into the aluminum oxide aquate gel by the process according to the invention and hence firmly anchored to the $TiO_2$ surface, does not in itself lead to the production of substantially non-greying $TiO_2$-pigments due both to defective contact with the surface of the pigment and to the sensitivity to thermal stressing, water and solvents.

In order to modify the properties of the pigment, the aftertreatment process according to the invention can be followed or preceded by other aftertreatment stages known per se (for example additional precipitation of $SiO_2$, $Al_2O_3$, $TiO_2$, $ZrO_2$, $SnO_2$, $MgO$, $ZnO$, phosphates etc., or organic aftertreatment with amines, hydroxy alkanes, epoxides etc.).

Any $TiO_2$-pigments produced either by the chloride process or by the sulfate process can be used as starting materials in the process according to the invention, Particularly suitable pigments are $TiO_2$-pigments of rutile structure which already have an aluminum-oxide-modified surface, i.e. $TiO_2$-pigments which have been produced for example by the combustion of $TiCl_4$ in the presence of $AlCl_3$ or by the calcination of a $TiO_2$ hydrolysis sludge in the presence of $Al_2O_3$, although the invention is by no means limited to these types of pigment.

By comparison with $TiO_2$-pigments which have been aftertreated with $SiO_2$ and $Al_2O_3$ and then calcined, the $TiO_2$-pigments aftertreated solely with aluminum salts in accordance with the invention are lighter, show a more pronounced blue tint and, in some cases, considerably greater brightening power. They show outstanding resistance to greying in laminates. Melamine-formaldehyde-, urea-formaldehyde- or phenol-formaldehyde-based laminates can contain the $TiO_2$-pigments treated in accordance with the invention advantageously in quantities of from about 1,0 to 40% by weight (based on the resin).

In order to test laminate stability, laminates were prepared with different $TiO_2$-rutile pigments. More particularly, the following procedure was adopted:

100 g of a melamine-formaldehyde resin were made into a paste with 60 ml of distilled water at 60° to 70°C by means of a glass rod and the resulting paste stirred with a glass stirrer following the addition of 50 ml of ethanol until the melamine resin completely dissolved. The solution obtained kept for only one day.

12.5 g of ground $TiO_2$-pigment were weighed into a glass beaker, 100 g of the resin solution were added and the components stirred for 5 minutes with an intense stirrer, 7500 – 8000 r.p.m. working on stator-rotor principle.

After the dispersion had been transferred to a porcelain dish, four strips of filter paper (Whatman No. 3) were semi-immersed one after the other, the saturated half fixed in a paperclip and then the other half immersed. In order to prevent the dispersion from dripping, both sides of the paper were stripped with a glass rod over the dish. The paper-clips with the impregnated strips hanging from them were suspended from a wire frame and left to dry for 20 minutes at 100°C. After cooling, the paper strips are drawn through unpigmented resin solution and stripped as described above. The specimens are then tempered for 20 minutes in a drying cabinet preheated to 138°C. The four strips of each specimen are placed one on top of the other, written on and placed between two clean, chromium-plated steel plates. The specimens are pressed for 13 minutes under a pressure of 105 kg/cm$^2$ in a hydraulic two-column laboratory handpress equipped with heating and cooling means which has been preheated to 149°C. Thereafter, the heating is switched off with the pressure intact and, for cooling to 40°C, the water cooling system brought into operation for 3 to 4 minutes. After a temperature of 40°C has been reached, the press can be opened and the pair of plates with the specimen in between removed. The pigmented laminate panels were measured for brightness before exposure and for percentage greying after exposure.

To this end, the remission of panels was determined from the lower half of the panel by means of an electrical remission photometer using a standardized green filter (Ry-filter). The remission value Ry determined is a measure of the brightness. The upper half of the plates was then masked with an aluminum foil in order subsequently to see the contrast between the exposed and unexposed surface. The masked side was placed on the edge of a rotating disc (3 r.p.m.) and, after the specimen had been exposed for 4 hours to the light of 6 Ultra-Vitalux lamps (arranged in a circle at a distance of 10 cm from the rotating disc), the Ry-value was measured at the same place on the specimen as before exposure. The expression (Ry before - Ry after exposure) . 100/Ry before exposure indicates the percentage greying.

In addition to brightness and percentage greying of the laminate panels, the brightening power of the pigment powder was measured in accordance with DIN 53,192; its blue tint was also measured. The difference between the remissions of blue and red filter ($R_z-R_x$) on a grey-paste rubbing with Ry $\pm$ (35 $\pm$0.2) % served as measure of the blue tint. This difference is known as the grey value. A more strongly positive grey value is indicative of a more pronounced blue tint and greater fineness of the pigment particles.

Brightening power and grey value were determined after the pigment had been ground for 60 minutes in a pulverisette. The described pigments were worked into laminates after grinding for 15 minutes in this mill.

The invention is illustrated by the following Examples:

EXAMPLE 1

125 g of a $TiO_2$ pigment which had been prepared by the sulfate process, calcined in the presence of $Al_2O_3$ (0.7% by weight, based on $TiO_2$) and then ground in a Raymond mill, were made into an aqueous suspension at room temperature with 950 ml of water and 1 ml of 10% HCl by means of a dissolver. A solution of 7 g of $Al_2(OH)_5Cl . 3 H_2O$ was added to this suspension which had a pH-value of around 7, reducing its pH-value to 4.65. The pH-value of this suspension was then adjusted to 5.4 over a period of 2.25 hours with 92 ml of a 0.1 normal soda lye, and to 6.0 over another 2.5 hours with another 83 ml of the 0.1 normal soda lye. The 83 ml of the 0.1 normal soda lye used additionally contained 2.26 g of ammonium peroxy disulfate $(NH_4)_2S_2O_8$. Thereafter, the pH-value of the weakly acid solution was adjusted to 7.5 with another 113 ml of 0.1 normal soda lye which, on this occasion, did not have any ammonium peroxy disulfate added to it. The pigment suspension was then filtered, washed with 2 liters of neutral, desalted water and dried for 4 hours at 180°C. The resulting pigment was then worked into a paper laminate and subjected to the laminate test. The percentage greying measured amounted to 1.3%. The pigment contained 3.1% by weight of $Al_2O_3$ and 0.27% by weight of $S_2O_8$ (based on the weight of the pigment). The brightening power according to DIN 53,192 amounted to 670, while the grey value measured 3.5.

EXAMPLE 2

563 g of the pigment described in Example 1 were made into a pulp with 1150 g of $H_2O$ and 168 ml of a basic aluminum nitrate solution of the composition $Al(OH)_{2.5}(NO_3)_{0.5}$. The basic aluminum nitrate solution had been prepared by dissolving coarse aluminum powder in a deficit of $HNO_3$, and contained 85 g of $Al_2O_3$ per liter. The pigment suspension had a pH-value of 4.15. The aqueous pigment suspension was then adjusted to a pH-value of 5.5 with 18 ml of 5% NaOH added over a period of 1 hour. In the interests of thorough distribution, the soda lye was introduced into a glass rotary pump by which the suspension was pumped around. An aqueous solution of 3.76 g of $(NH_4)_2S_2O_8$ in 225 ml of water was then introduced dropwise into the pigment suspension over a period of 30 minutes, after which the pH-value fell to 5.35. By introducing more 5% NaOH, the pH-value was adjusted to 6.6 over a period of 2 hours and to 7.5 over a period of another 30 minutes (60 ml of 5% NaOH). The pigment suspension was filtered, washed with 5 liters of cold water and, finally, the filter cake was dried for 4 hours at 180°C. The pigment worked into a laminate (starting remission Y-filter 85%) showed a percentage greying of 1.2% after exposure to light. It contained 3.2% be weight of $Al_2O_3$ and 0.1% of $HNO_3$ (based on $TiO_2$). The brightening power according to DIN 53,192 amounted to 720 and the grey value to 3.6.

EXAMPLE 3

625 g of the pigment described in Example 1 were made into a pulp with 4800 ml of $H_2O$ and 195 ml of the basic aluminum nitrate solution described in Example 2 ($\hat{=}$ 2.5% by weight of $Al_2O_3$). The pH-value was adjusted to 5.0 by addition of 0.4% NaOH over a period of 30 minutes and then, in a second stage, the pH was increased to 7.5 by the uniform addition of 0.4% NaOH over a period of 6 hours during which the pigment suspension was adequately stirred. The second batch of soda lye contained 4.3 g of $NaNO_2$ in solution. The pigment worked up as in Example 2 and worked into the laminate showed a percentage greying of 1.0% after exposure to light. The pigment-optical data correspond to the details given in Example 2. The pigment contained 3.1% by weight of $Al_2O_3$ and 0.15% by weight of ($NO_3 + NO_2$), based on $TiO_2$.

EXAMPLE 4

A solution of 1.25 g of sodium nitrate $NaNO_2$ in 50 ml of $H_2O$ was added to 125 g of a $TiO_2$ pigment calcined in the presence of $Al_2O_3$ (0.7% by weight, based on $TiO_2$) and then ground in a Raymond mill after it had been made into a suspension in 900 ml of $H_2O$. After addition of a solution of 7.0 g of the commercially available basic aluminum salt $Al_2(OH)_5Cl \times 3 H_2O$, in 50 ml of $H_2$, the pH-value of the pigment suspension amounted to 5.3. After stirring for 1 hour, the pigment suspension was cast on to metal plates in a layer thickness of 4 mm and dried in a drying cabinet for 24 hours at 80°C. The percentage greying in the laminate test amounted to 2.4 for an initial remission of 83%. The brightening power according to DIN 53,192 and the grey value amounted to 730 and 3.6 respectively. The pigment contained 3.1% by weight of $Al_2O_3$ (based on $TiO_2$) and 0.65% by weight of $NO_2$ (based on $TiO_2$).

EXAMPLE 5

40 kg of the pigment described in Example 4 were stirred with 13.2 liters of water and 9.8 liters of a solution of the commercially available basic aluminum salt $Al_2(OH)_5Cl . 3 H_2O$, to form a free-flowing suspension. The solution of the basic aluminum salt contained 1 mole of $Al_2O_3$ per liter. 169 g of ammonium peroxy disulfate $(NH_4)_2S_2O_8$ in the form of a solution in 4 liters of water were additionally added to the $TiO_2$ suspension. Stirring was continued for 1 hour in order to establish constant conditions. The pigment suspension was then in the form of a homogeneous, non-sedimenting sludge. The resulting sludge was subsequently spray-dried in a spray tower at an inlet temperature of 160°C. In the laminate test, the pigment showed a percentage greying of 2% for an initial remission of 85%. The pigment had a brightening power according to DIN 53,192 of 660 and a grey value of 3.7. The $TiO_2$-pigment contained 3.0% by weight of $Al_2O_3$ (based on $TiO_2$) and 0.35% of $S_2O_8$ (based on $TiO_2$).

EXAMPLE 6

Example 5 is repeated with the following modification: instead of an aqueous solution of ammonium peroxy disulfate $(NH_4)_2S_2O_8$, a solution of 360 g of $NaNO_3$ is added to the aqueous pigment suspension. The brightening power of the pigment according to DIN 53,192 amounted to 740 and its grey value to 3.8. The $TiO_2$-pigment contained 3.0% by weight (based on $TiO_2$) of $Al_2O_3$ and 0.66% by weight (based on $TiO_2$) of $NO_3$. The percentage greying of the laminate amounts to 1.2%.

EXAMPLE 7

A solution of the composition $Al(OH)_2Cl$ was prepared by dissolving coarse aluminum powder in a deficit of HCl. This solution contained 0.84 mole of $Al_2O_3$ per liter. 125 g of the $TiO_2$-pigment mentioned in Example 4 were made into a pulp with 900 ml of water and 36.5 ml of the basic aluminum chloride solution. A solution of 2.0 g of $NaBO_2 . H_2O_2$ in 100 ml of $H_2O$ was added to the aqueous suspension, giving a pH-value of 6.1. The pigment suspension was concentrated by drying at 60°C in a vacuum rotary evaporator. The pigment worked into a laminate showed a percentage greying of 2.1% (initial remission 84%). The pigment contained 3% by weight of $Al_2O_3$ and 1.23% by weight of ($BO_2^-\cdot H_2O_2$), based on $TiO_2$.

EXAMPLE 8

40 kg of a $TiO_2$-pigment which had been prepared in the usual way by the sulfate process, but calcined in the absence of stabilizing additives and then ground were stirred to form a free-flowing suspension with 17.2 liters of water and 12.6 liters of a basic aluminum nitrate solution. Coarse aluminum powder was dissolved in a deficit of 2.5 N nitric acid to produce the basic aluminum nitrate solution corresponding to the composition $Al(OH)_{2.5}(NO_3)_{0.5}$; it contained 0.78 mole of $Al_2O_3$ per liter. Stirring was continued for another hour in order to establish constant conditions. The pigment suspension was then in the form of a homogeneous non-sedimenting sludge. The resulting sludge was then spray-dried in a spray tower at an inlet temperature of 160°C. In the laminate test, the pigment gave a percentage greying of 4% for an initial remission of 87%. Brightening power and grey value amounted to 820 and 4.2, respectively. The $TiO_2$-pigment contained 2.5% by weight of $Al_2O_3$ and 1.6% by weight of $NO_3$ (based on $TiO_2$).

EXAMPLE 9

Example 8 was repeated with pigment which had been prepared by the sulfate process, calcined in the presence of $Al_2O_3$ (0.7% by weight, based on $TiO_2$) and then ground in a Raymond mill, using a solution of a salt of the composition $Al(OH)_2NO_3$. After exposure, the laminate produced with the pigment showed a percentage greying of 0.8%. The brightening power of the $TiO_2$-pigment according to DIN 53,192 amounted to 740 and the pigment had a grey value of 3.7. A value of 85% was measured as the starting remission.

It will be appreciated that the instant specification and examples are set forth by way of illustration and not limitation, and that various modifications and changes may be made without departing from the spirit and scope of the present invention.

What is claimed is:

1. A process for the production of a substantially non-greying titanium dioxide pigment coated with a layer of aluminum oxide aquate, comprising drying at about 25° to 200°C a suspension of a titanium dioxide pigment in a solution of a basic aluminum salt, said solution being selected from the group consisting of (a) a solution of basic aluminum chloride containing an oxidizing salt, (b) a solution of basic aluminum nitrate, and (c) mixtures thereof, the basic aluminum salt being present in said solution in such amount that the dried titanium dioxide pigment contains about 0.5 to about 10% by weight of aluminum oxide aquate (calculated as $Al_2O_3$), and the nitrate and oxidizing salts being present in such amount in the solution that their anions are present in the titanium dioxide pigment to the extent of about 0.05 to 3% by weight.

2. The process of claim 1, wherein the basic aluminum salt has a ratio of aluminum cation $Al^{3+}$) to chloride or nitrate anion of about 0.5 to 5.

3. The process of claim 2, wherein the basic aluminum salt has a ratio of aluminum cation ($Al^{3+}$) to chloride or nitrate anion of about 1 to 3.

4. The process of claim 2, wherein the basic aluminum salt has the approximate composition $Al_2(OH)_5Cl$.

5. The process of claim 3, wherein the basic aluminum salt has the approximate composition $Al(OH)_{2.5}(NO_3)_{0.5}$.

6. The process of claim 1, wherein the solution of the basic aluminum salt is a solution of basic aluminum chloride containing an oxidizing salt selected from the group consisting of a nitrate, nitrite, peroxy disulfate, peroxidic addition compound or mixture thereof.

7. The process of claim 1, wherein the solution of the basic aluminum salt is a solution of basic aluminum chloride containing $NaBO_2\cdot H_2O_2$.

8. The process of claim 1, wherein the suspension is dried at about 80° to 120°C, the basic aluminum salt having a ratio of aluminum cation $Al^{3+}$) to chloride or nitrate anion of from about 1 to 3 and being present in such amount that the dried titanium dioxide pigment contains about 2 to 5% by weight of aluminum oxide aquate (calculated as $Al_2O_3$) the nitrate and oxidizing salts being present in an amount such that their anions are present in about 0.2 to 2% by weight of the titanium dioxide pigment.

9. A process for the production of a substantially non-greying titanium dioxide pigment coated with a layer of aluminum oxide aquate, comprising adding a solution of basic aluminum chloride or nitrate to a titanium dioxide pigment suspension, adjusting the pH to about 5 or 6, adding an aqueous solution of an oxidizing salt, adjusting the pH to about 6 to 7 initially, subsequently adjusting the pH to about 7 to 8, filtering and then washing the pigment with water, and drying at about 100°C to 200°C, the basic aluminum chloride or nitrate being present in said suspension in such amount that the dried titanium dioxide pigment contains about 0.5 to about 10% by weight of aluminum oxide aquate (calculated as $Al_2O_3$), and the oxidizing salt and aluminum nitrate, if the latter is present, being present in such amount in the suspension that their anions are present in the titanium dioxide pigment to the extent of about 0.05 to 3% by weight.

10. A titanium dioxide pigment coated with about 0.5 to 10% by weight of aluminum oxide aquate (calculated as $Al_2O_3$) and about 0.05 to 3% by weight of an anion of an oxidizing salt selected from the group consisting of a nitrate, nitrite, peroxy disulfate, perborate or mixture thereof.

11. A titanium dioxide pigment according to claim 10, wherein the aluminum oxide aquate is present in about 2 to 5% (calculated as $Al_2O_3$) and the anion of an oxidizing salt is present in about 0.2 to 2% by weight.

* * * * *

UNITED STATES PATENT OFFICE
CERTIFICATE OF CORRECTION

Patent No. 3,853,575                                     Dated  December 10, 1974

Inventor(s)  Bernd Holle et al

It is certified that error appears in the above-identified patent and that said Letters Patent are hereby corrected as shown below:

Page 1, under [30] Foreign Application Priority Data, delete "2206772" and substitute -- 2206777 --.

Col. 5, line 18, correct the spelling of "substances".

Col. 9, line 5, delete "3%" and substitute -- 3.1% --.

Col. 10, Claim 5, line 1, delete "3" and substitute

-- 2 --.

Col. 10, Claim 10, line 3, delete "$Al^2O_3$" and substitute

-- $Al_2O_3$ --.

Signed and sealed this 13th day of May 1975.

(SEAL)
Attest:

RUTH C. MASON
Attesting Officer

C. MARSHALL DANN
Commissioner of Patents
and Trademarks